United States Patent [19]

Westcott et al.

[11] Patent Number: 5,026,994

[45] Date of Patent: Jun. 25, 1991

[54] METHOD AND APPARATUS FOR MEASURING THE SIZE DISTRIBUTION OF PARTICLES

[75] Inventors: Daniel R. Westcott, North Syracuse; William C. Tetley, Syracuse; Bruce A. Cummings, Baldwinsville, all of N.Y.

[73] Assignee: RAD-X Ltd., Syracuse, N.Y.

[21] Appl. No.: 562,803

[22] Filed: Aug. 6, 1990

[51] Int. Cl.$^5$ .............................................. G01T 7/04
[52] U.S. Cl. ................................... 250/435; 250/253; 250/255; 250/472.1
[58] Field of Search ............... 250/304, 435, 436, 255, 250/253, 370.02, 380, 472.1; 73/863.23; 356/36

[56] References Cited

U.S. PATENT DOCUMENTS

| | | | |
|---|---|---|---|
| 4,607,165 | 8/1986 | Burghoffer et al. | 250/380 |
| 4,704,527 | 11/1987 | Peodi | 250/304 |
| 4,704,528 | 11/1987 | Peodi | 250/304 |
| 4,847,503 | 7/1989 | Tetley et al. | 250/435 |
| 4,963,730 | 10/1990 | Tetley et al. | 250/432 R |

Primary Examiner—Carolyn E. Fields
Assistant Examiner—Drew A. Dunn
Attorney, Agent, or Firm—Wall and Roehrig

[57] ABSTRACT

Particle detection devices for measuring the size distribution data of the parallel plate and screen diffusion types are disclosed in order to determine the distribution of ultrafine and attached particles in both analog and digital form. A gradual changing of the dimensions of the detector chambers is discslosed for varying the airstream velocity and for spreading out the plating out of the particles so that the distribution of different size particles can be determined. Recent improvements in health risk evaluation data indicate it is important to have detailed size distribution data for ultrafine particles in order to fully evaluate the health risks.

25 Claims, 2 Drawing Sheets

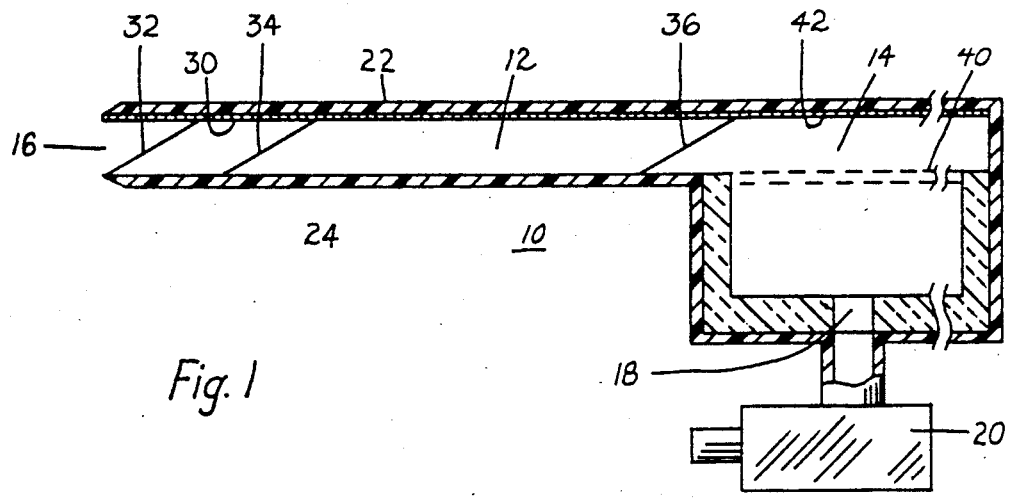
Fig. 1
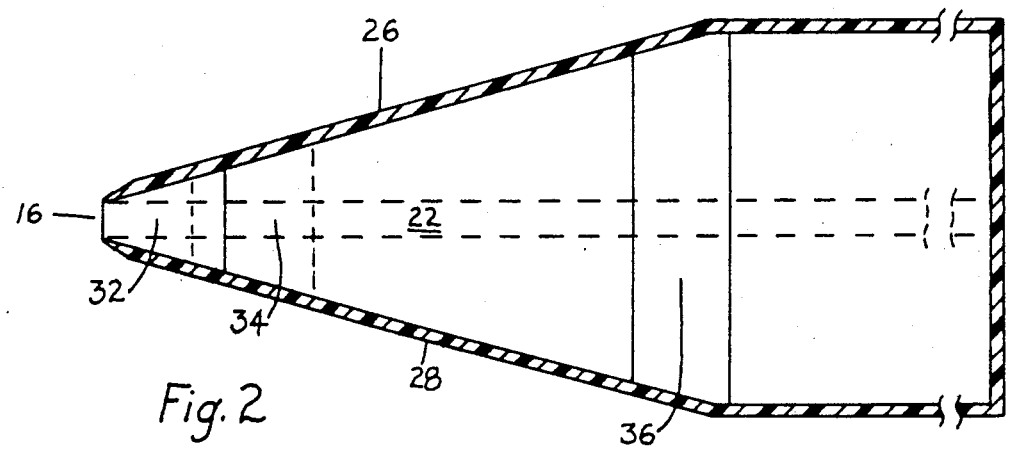
Fig. 2
Fig. 3
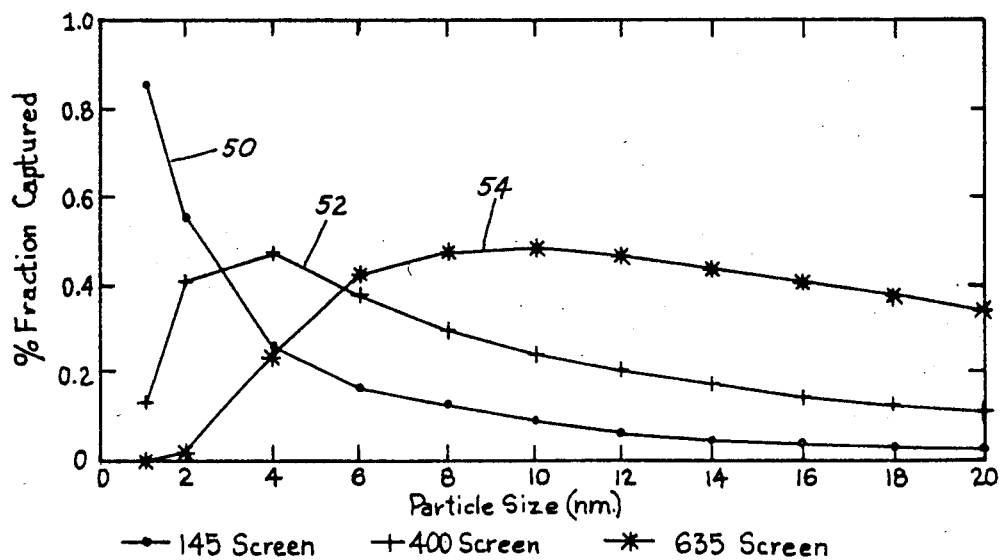

METHOD AND APPARATUS FOR MEASURING THE SIZE DISTRIBUTION OF PARTICLES

BACKGROUND OF THE INVENTION

This invention relates to particle detectors, and more particularly to a method and apparatus for measuring the size distribution of particles in an atmosphere.

As described in detail in our U.S. Pat. No. 4,847,503 issued July 11, 1989, and our application Ser. No. 325,921 filed Mar. 20, 1989, radon is a disintegrating by-product of radium which in high concentration levels can be dangerous to human health. Traditionally, radon progeny have been divided into two general groups or fractions. The first involved what was referred to as unattached progeny wherein airborne progeny were carried along by ultrafine aerosol particles having a size of ten nm or less. The second fraction was referred to as attached progeny wherein the progeny was attached to dust particles of a size larger than ten nm generally twenty nm or greater. Recent investigations have determined that the more traditional "bimodal" activity size distributions are no longer valid. Recently, the unattached fraction actually has been determined as an ultrafine particle mode in the 0.5 to 3.0 nm size range whose nature is dependent upon the gaseous environment surrounding the radon decay products. There have also been disclosed several indoor activity-weighted size distribution measurements indicating the presence of a nucleation mode as a significant airborne mode with a size range from three nm up to approximately 20 to 50 nm, depending on the chemistry and/or particle size distribution of the ambient air. The attached progeny or accumulation mode is generally now considered to be everything above the nucleation mode. The result is now to refer to a "trimodal" distribution in which the three modes are: unattached, nucleation, and attached or accumulation. Furthermore, it is sometimes convenient to refer to the unattached and nucleation modes as "ultrafine progeny".

The principal health threat from radon comes from the ultrafine progeny which have greater mobility over their attached counterparts and which are more readily deposited in the sensitive regions of the respiratory tract. The health risk posed by this exposure to ultrafine progeny thus requires that a greater understanding and knowledge of the entire range of unattached and nucleation progeny be determined. Therefore, it has become increasingly important to be able to map the size distribution of radon progeny in a particular environment. In order to be able to accurately asses bronchial doses from radon progeny with different activity-weighted size distributions, it has become necessary to provide detectors to record the characteristics of this trimodal distribution.

As discussed in detail in the aforementioned patents, various devices have been available for testing for radon and even for testing for radon progeny. However, except for our foregoing patents, the ratio of progeny present to radon gas as well as the ratio of the unattached progeny to the total progeny could only be inferred from average measurements. Our foregoing patents disclose two devices and methods for broadly measuring the unattached and attached fractions of radon progeny which greatly help to limit the wide variation in inferred levels from average measurements. The foregoing patents generally divide the unattached progeny at the ten nm level with the attached progeny being anything over that. As indicated above, it has subsequently been found that there is an interval of progeny due to nucleation and other factors that appears to be an intermediate mode between the unattached and accumulation modes now called nucleation mode with a size range as indicated above.

While the method and apparatus disclosed herein are directed specifically to detection of radon progeny attached to aerosol particles, broadly speaking our method and apparatus apply to aerosol particle detection by diffusion plating out in our novel apparatus in accordance with our novel methods. Our method and apparatus may be applied to particle size distribution problems, environmental analysis problems and related aerosol particle involved problems.

OBJECTS AND SUMMARY OF THE INVENTION

Accordingly, it is an object of the present invention to provide a device for detecting and recording ultrafine particles.

It is a further object of the present invention to provide a method and apparatus for detecting and recording detailed activity-weighted size distribution data for ultrafine progeny and an overall integrated measurement of the amount of progeny in the accumulation mode.

It is another object of the present invention to provide a method and device for determining the particle size distribution over the range of 0.5 to 50 nm for a given air flow sample.

It is yet another object of the present invention to provide a method and apparatus for determining the concentration of radon progeny over an activity-weighted size distribution curve to determine the bronchial dose estimates of concern for human health.

It is a further object of the present invention to provide a method and apparatus for mapping the size distribution of particles in an airstream.

It is yet a further object of the present invention to provide a device for measuring the activity-weighted size distribution of radon progeny in an airstream so that the associated diffusion coefficients for the $d_p$ (50%) diameters are in a geometric progression.

It is a still further object of the present invention to provide an apparatus in which different detector materials can be used for varying sensitivities and saturation limits in order to obtain different run times appropriate to the health risks involved in a given radon containing environment.

It is a still further object of the present invention to provide size distribution detection devices for particles having both analog and digital data acquisition and readout capabilities.

It is a still further object of the present invention to provide a parallel plate diffusion battery detector and a multiple diffusion screen detector to provide size distribution information on particle-containing atmospheres.

It is a still further object of the present invention to provide an activity-weighted size distribution detection device for unattached and nucleation mode progeny separate and distinct from an attached progeny mode detection device.

It is a still further object of the present invention to provide progeny detection devices having a first stage designed to capture the unattached and nucleation modes and a second stage designed to capture the attached progeny mode.

These and other objects of the present invention are attained by means of a particle detector having a diffusion means first stage and a filter means second stage connected to a small pump adapted to draw a laminar flow of ambient air sequentially through the stages so that ultrafine particles will diffuse out in the first stage and that larger attached particles will be captured in the second stage of the device to provide a size distribution measurement of the ultrafine particles present in the ambient airflow stream and an overall measurement of the attached particles.

BRIEF DESCRIPTION OF THE DRAWINGS

For a better understanding of these and other objects of the present invention, reference is made to the following detailed description of the invention which is to be read in conjunction with the accompanying drawings wherein:

FIG. 1 is a side elevation of a diffusion screen detector in accordance with the present invention;

FIG. 2 is a top plan view of the device of FIG. 1;

FIG. 3 is a typical graphic representation of capture on screen vs. particle size for a three screen diffusion screen detector;

DETAILED DESCRIPTION OF THE INVENTION

Figure 4:
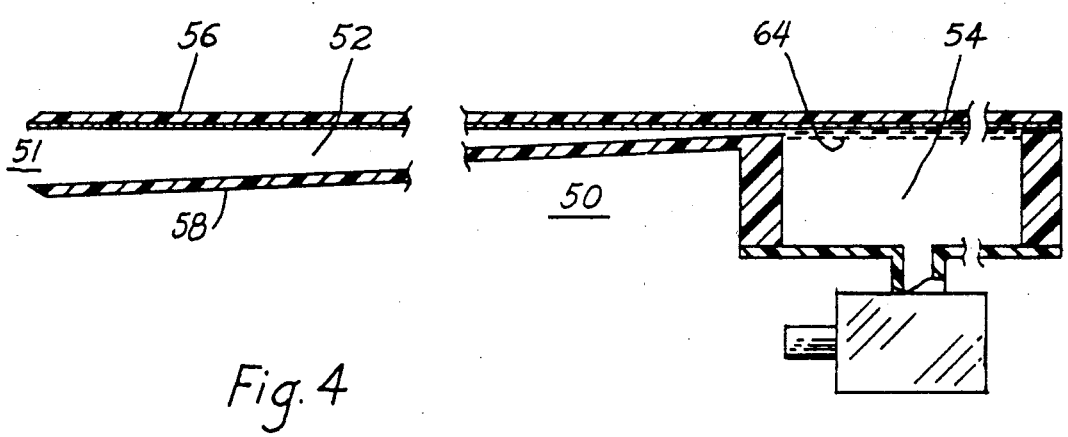
FIG. 4 is a side elevation of a parallel plate detector in accordance with the present invention.

Referring now to FIG. 1, there is shown a three diffusion screen embodiment of a particle/radon progeny detector 10 according to the present invention. Detectors having greater or lesser numbers of screens may be used for particular applications, as will become apparent from a fuller understanding of the invention as set forth below. The detector 10 comprises a first detection chamber 12 and a second detection chamber 14 connected for smooth laminar flow of air through the entrance 16 of chamber 12 and through an exit 18 in chamber 14 to a fan 20 which is designed to pull air through the two chambers in a smooth laminar flow. The first chamber 12 has a pair of plates 22 and 24 forming a top and bottom of a diverging generally triangular shaped cross section chamber as shown in FIG. 2. The plates 22 and 24 are spaced generally one centimeter apart throughout their entire length and the opening between the sides 26 and 28 varies from an entrance spacing of 0.69 centimeters to an exit spacing of 6.2 centimeters. The overall length of the first chamber 12 is shown as 10 cm. The inside surface of the top plate 22 is coated with a radiation detection material such as cellulose nitrate; allyl dyglycol carbonate (CR-39); thermoluminescence detectors (TLD); radiation detecting electronic sensors or like materials, depending upon the particular application, the detector is to be used for. The bottom plate 24 may also be coated with detection material, if desired, and for some applications only a strip of detecting material may be used on the top and/or bottom plate. The layer 30 shown in FIG. 1 is of the CR-39 type, although other materials may be used for different applications.

Positioned within the chamber 12 are three diffusion screens 32, 34 and 36. The screens are disposed at an angle of 30 degrees to the top and bottom and extend from top to bottom and side to side within the chamber at the particular location thereof, as will be discussed in more detail below. As may be seen in FIG. 1, the screen 32 is positioned with its leading edge at the entrance to the chamber and the screen 34 is placed approximately two centimeters downstream from screen 32 and the final screen is placed with its trailing edge at the exit edge of the chamber. The leading edge of the screen 36 is approximately 9.1 centimeters from the entrance to the chamber.

The entrance 16 to the screen detector is specially constructed to minimize depositional losses on the front face of the detector. By tapering the wall thickness of the top, bottom and sides of entrance 16 so that the total cross sectional area of the entrance opening walls is substantially less than the cross sectional area of the entrance opening, a lot of information is not lost by uncontrolled plate out.

The second detection chamber 14 is connected directly to the first chamber 12 and has extending thereacross a filter member 40 mounted on a supporting structure so as to allow airflow therethrough. Connected to the discharge side of chamber 14 is a low volume air pump 20 capable of pulling approximately one liter of air per minute through the chambers and discharging it. Other velocities may be chosen for other types of applications as is well known in the art. The width of chamber 14 is the same as the exit of the chamber 12, namely 6.2 centimeters in the illustration shown and has a length of approximately 10 cm. Thus, it will be seen that the area of the filter member 40 is substantially greater than the area of the ultrafine progeny detector screen 32. A ratio of 10 to 1 has been found satisfactory. The layer of CR-39 at the top of chamber 12 is expanded into chamber 14 at 42 to record the tracks from radon progeny trapped out on the filter member 40.

Since it has been found that the ultrafine particles/progeny plate out on the screens 32, 34 and 36 in a uniform pattern from side to side we can use a narrow strip of radiation detection material on the inside of the top plate 22 instead of coating the entire inner surface thereof. This not only saves detection material 30, but also speeds up the analysis time and yet is directly indicative of the total airstream content. When properly calibrated, a strip 31 shown in dotted lines in FIG. 2 can give accurate results for most applications and can replace the coating 30.

The diffusion screens 32, 34 and 36 are chosen with different mesh sizes and are spaced along the length of the first detector chamber 12 to remove the desired size ultrafine progeny so as to provide a suitable activity-weighted distribution pattern of the progeny in the airstream.

As indicated above, it has now become increasingly important to determine the size of the progeny in an airstream or environment and to do this, it is necessary to establish standards by which size patterns can be determined. A useful parameter for screen diffusion batteries is the $d_p$ (50%) diameter of the screen. This is defined as the particle size for which 50% of the particles penetrate the screen. For smaller particles a smaller fraction penetrate the screen. For larger particles, the reverse is true. This particular parameter depends both on the characteristics of the screen, namely mesh and material, and the superficial air velocity.

With a series of screens the $d_p$ (50%) diameter at a particular point in the detector is a function of the individual screen $d_p$ (50%) diameters encountered to that point.

This particular relationship for a specific air velocity is shown in FIG. 3 for three different screen sizes. As shown by curve 50, a 145 mesh screen is very efficient in picking up the very smallest fraction, while its efficiency drops off rapidly. Its $d_p$ (50%) can be seen as 2.2 nm on curve 50 for small size fractions and a diffusion coefficient of 0.01 $cm^2$/sec. A 400 mesh screen, curve 52, is shown for this particular application to reach the 50% level at approximately 6.75 nanometers (cumulative), which equates to 0.00115 $cm^2$/sec diffusion coefficient. A 635 mesh screen, curve 54, is shown to peak somewhere around ten nanometer size but the cumulative $d_p$ (50%) point is not reached until the twenty nanometer size particle. This again equates to 0.000132 $cm^2$/sec diffusion coefficient. A cursory review of the diffusion coefficients above shows the geometric progression relationship for particles from 2.2 to 20 nm with the screens as placed in FIG. 1 and a specific superficial airflow velocity. The precise relationship between the mesh, screen size, detector chamber, and air velocity will of course effect the precise plot of the relationships indicated in FIG. 3.

In the embodiment shown in FIGS. 1 and 2, the screen 32 has a mesh size of 145, the screen 34 a mesh size of 400, and the screen 36 a mesh size of 635. The screens 32, 34 and 36 can be made of a plastic or stainless steel material, as desired. The airflow of one liter per minute within the construction shown is designed to yield cumulative $d_p$ (50%) diameters of 2.2, 6.75, and 20 respectively for the screens 32, 34 and 36. In this way a good activity-weighted size distribution curve can be obtained for the ultrafine progeny in a particular airstream because this facilitates the uniform fractioning of the progeny over the three screens which will maximize the reconstruction efficiency. In effect, a "digital" readout of the particle sizes is obtained. Attached progeny, generally larger than 20 nm will be captured on the filter 40 in the chamber 14 so that the risk factors in any given environment may be completely and thoroughly analyzed.

Another factor involved in the present invention is the angle of the screens in the chamber 12. The critical angle for CR-39 material is 27.5 degrees and therefore, a thirty degree angle near the intersection of the CR-39 screen detector represents a good compromise between the $4\pi$ efficiency of the detection material and a screen angle that does not produce a large deviation in the penetration curves. The thirty degree screen concentrates the track density and thereby reduces the amount of time required to obtain a statistically significant sample.

Thus, in operation, as a sample airstream is drawn through the chamber 12 into the chamber 14 and exhausted the smallest particles will be plated out on the screen 32 and recorded on the CR-39 layer 30 above the screen 32. This will generally be the ultrafine particle mode in the 0.5 to 3.0 nm size range. The nucleation mode of radon progeny will tend to be captured on the screens 34 and 36. Screens 34 and 36 will collect increasingly larger particles with the overall $d_p$ (50%) diameter of 20 nm being achieved at the discharge of the third screen.

To achieve this improved capture and distribution, the width of detection chamber 12 is expanded, as can be seen in FIG. 2, which slows the velocity of the airstream as it progresses through the chamber and increases the efficiency and ability of the screens 34 and 36 to plate out the larger size particles. At the velocity at the entrance to the chamber, the larger size particles are able to pass directly through the screen 32 with minimal plating out. As the flow velocity slows, the larger particles can be readily plated out and recorded to give the desired deposition pattern for the ultrafine progeny, which it has been demonstrated are the particles of most concern from a health standpoint. This action is facilitated both by the slowing of the airstream velocity due to the expanding width of chamber 12, and the decreasing mesh size of screens 34 and 36. Thus, the chances of larger particles plating out increases significantly the further the airstream slows and the finer the screen mesh size becomes. By the time the airstream reaches the exit of chamber 12, substantially all the ultrafine progeny have been plated out on one of the screens. All remaining particles will be trapped on the filter 40. This latter also holds true for the embodiment of FIGS. 4 and 5, as will be detailed herein, in which the gap reduction is analogous to the smaller mesh sizes above.

Referring now to FIGS. 4 and 5 there is shown a parallel plate diffusion battery detector in accordance with the principles of the present invention. In this embodiment, the progeny detector 50 comprises a first diffusion battery chamber 52 and a second filter chamber 54. The first diffusion battery chamber 52 gradually increases in width at the same time that it decreases in gap between the top and bottom 56 and 58 so as to form a gradually tapered decreasing gap chamber over a length of some 65 cm, while at the same time increasing the width between the side plates 60 and 62 from 2½ cm to approximately 10 cm over the same 65 cm length. This decreasing gap size makes it easier and more likely for the larger ultrafine particles (i.e., 10 nm and larger) to collide with and plate out on the chamber 52 walls, the further into the chamber the air stream progresses. At the entrance 51 to chamber 52 the opening is wide enough so that with an air velocity of 0.75 lpm, the larger particles pass straight through. The smaller particles are plated out adjacent the entrance and generally within the first 2 cm. With the gradual narrowing of the gap and the increasing surface area particles of gradually increasing size will be plated out on the walls of the chamber 52 as the airstream progresses therethrough.

It thus will be seen that a complete analog picture of the particles in an airstream will be created and the amount of information that can be derived therefrom is only limited by the amount of time one wants to spend on analyzing the data presented.

The entrance to the filter chamber 54 is covered with a layer of filter material 64 designed to capture the attached progeny and any ultrafine progeny that escape the first diffusion battery chamber 52. The second filter chamber 54 is sized approximately 16 cm long with the same width as the exit end of chamber 52, namely 10 cm. The area is chosen to be approximately ten times the area of the first 2 cm of internal chamber 52 surface. The entrance gap between the top and bottom plates 56 and 58 of the diffusion battery chamber 52 is approximately 0.16 cm and the width is 2.5 cm. The gap tapers from the 0.16 cm to 0.02 cm at the exit end. The inside surface of top plate 56 is coated with CR-39 or other suitable detection material for the particular application to which the detector is to be applied. This layer of CR-39 or other material may extend throughout the length and width of the detection chamber 52 and throughout the top of the detection chamber 54, or it may take the form of a central strip 55 shown in dotted lines in FIG. 5. In this way, the progeny plated out on the surface of the chamber 52 (top and bottom) and captured on the filter 60 of chamber 54 are recorded and tracked. With these dimensions and a flow rate of 0.75 liters per minute, the ultrafine progeny from 0.5 nm to as high as 20 nm sizes can be plated out over the length of the parallel plate battery to give a good activity-weighted size distribution curve for the 0.5 to 20 nm particle sizes which are the most important from a health standpoint.

Figure 5:
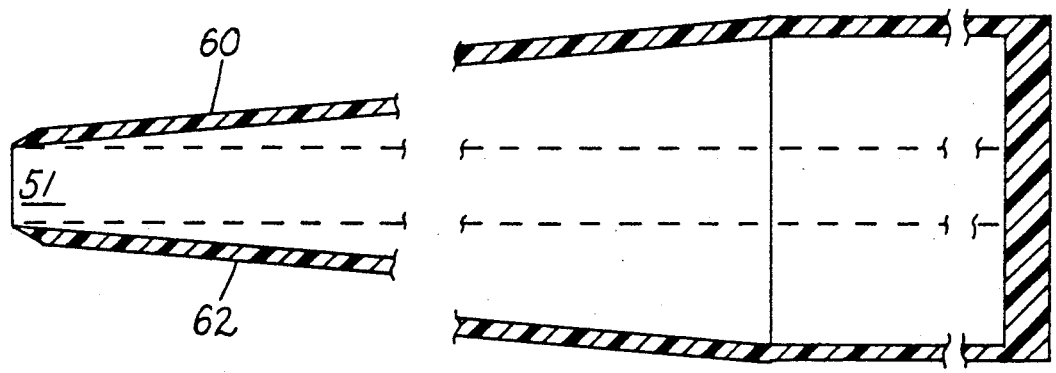
FIG. 5 is a top plan view of the device of FIG. 4.

In operation of either of the devices shown in FIGS. 1, 2, 4 and 5, the air is drawn through the first and second detection chambers for a given period of time and the amount of the radiation produced by the progeny trapped on the screens or on the parallel plate detector chamber is recorded on CR-39 or other radiation detection material. At the end of the designated test period, the detection is analyzed to determine the activity-weighted size distribution of the progeny sampled, either analog or digital, for use in the health risk evaluation process. As pointed out in our above U.S. Pat. No. 4,847,503, the parallel plate diffusion battery approach provides very sensitive accurate analog activity-weighted particle distribution data for the ultrafine particle size range with the balance of the attached particles of larger size being captured by the filter 64 in the second detector compartment of the two-chamber detector of FIGS. 4 and 5. The analog data developed by the embodiment of FIGS. 4 and 5 is particularly useful in the study and research areas involved in radon progeny detection, while the digital data developed by the diffusion screen battery of FIGS. 1 and 2 is more readily utilized in the shorter term exposure monitoring and mail-in detectors for multi-seasonal assessment of exposure in dwellings. Obviously, specific adaptations of the foregoing principles will be developed for any particular application.

It should be apparent from the foregoing that the apparatus and method of the present invention will permit detailed size distribution data to be collected and displayed for particles in the ultrafine particle mode as well as the attached particle mode. By providing size distribution data for the unattached and nucleation mode, (i.e., ultrafine particles in the 0.5 to 20 to 50 nm size range) more complete data and health risk information can be developed for quantifying and qualifying the health risks involved in exposure to the material attached to the aerosol particles whether it be radon progeny, chemical contaminants or otherwise. By extension of the concepts of the present invention, the size distribution within the attached particle mode can be developed for further study of the health risks involved.

The embodiments of FIGS. 4 and 5 can be further modified to permit differentiation between the P0218 and P0214 alpha energy particles by coating the CR-39 with a plastic coating that will slow down the alpha energies to the point where their track sizes are significantly different and can be tabulated. It is thus possible to differentiate between the two different alpha particles in a particular environment as well as obtaining the activity weighted size distribution.

While the foregoing has been disclosed using CR-39 detection material, other materials can be used such as silicon surface barrier detectors (DIADS); calcium fluoride (TLDs) as indicated above and other electronic detection means. Other substrates suitable for use in plating out aerosol particles may also be used in place of the radiation detection materials listed. Other materials can also be used as coatings over these materials for varying the energy levels of the particles being observed and tracked.

While the present invention has been described with specific reference to the structure as disclosed herein, it is not confined to the detail set forth in this application and is intended to cover any modifications or changes as may come within the scope of the following claims.

What is claimed is:

1. In a particle detector of the type having first and second detection chambers connected together for smooth flow of an airstream therethrough, means for measuring size distribution of particles comprising;
   a first detection chamber for causing ultrafine particles to plate out therein having an entrance width substantially less than the exit width thereof;
   a second detection chamber for trapping out attached particles therein; and
   detection means disposed in said first and second detection chambers for recording the characteristics of the particles plated out in said first and second chambers.

2. A particle detector as claimed in claim 1 wherein said first detection chamber has a cross-sectional area that varies from entrance to exit thereof.

3. A particle detection apparatus as described in claim 1 wherein at least a portion of the top inside surface of said first detection chamber is coated with radiation detection means for detecting the presence of radon progeny.

4. A particle detection apparatus as described in claim 1 wherein the space between the top and bottom of said first detection chamber decreases from entrance to exit thereof.

5. A particle detection apparatus as described in claim 1 including means for capturing ultrafine particles of at least two different sizes; said means being spaced longitudinally along the length of said first detection chamber.

6. A particle detection apparatus as described in claim 5 wherein said means for capturing ultrafine particles include a plurality of diffusion screen means mounted within said first detection chamber.

7. A particle detection apparatus as described in claim 6 wherein said means for capturing particles includes first and second diffusion screen means mounted in spaced relation within said first detection chamber said first diffusion screen means being mounted in the entrance to said first detection chamber, and the last diffusion screen means being mounted adjacent the exit of said first detection chamber.

8. A particle detection apparatus as described in claim 7 wherein said diffusion screen means are mounted within said first detection chamber at an acute angle to the direction of air flow therethrough.

9. A particle detection apparatus as described in claim 8 wherein said diffusion screen means are mounted at an angle of 30 degrees to the axis of said first detection chamber.

10. A particle detection apparatus as described in claim 6 wherein said plurality of screen means are spaced along the length of said first detection chamber so that the diffusion coefficient of the $d_p$ (50%) particle sizes for each screen form a geometric progression from input to output.

11. A particle detection apparatus as described in claim 10 wherein said first diffusion screen means is sized to have a $d_p$ (50%) number of 2.2 nm, a second diffusion screen means is sized to have a cumulative $d_p$ (50%) number of 6.75 nm and a third diffusion screen means a cumulative $d_p$ (50%) number of 20 nm.

12. A particle detection apparatus as described in claim 11 wherein the mesh size of said first diffusion screen means is 145, a second diffusion screen means is 400 and a third diffusion screen means 635 respectively.

13. A particle detection apparatus as described in claim 12 wherein the entrance width of said first detection chamber is 0.69 cm, said exit width is 6.2 cm, the length is 10 cm, and the spacing between the top and bottom is 1 cm.

14. A particle detection apparatus as described in claim 1 wherein the cross sectional area of the walls of the entrance to said first chamber is less than the cross sectional area of said entrance.

15. A particle detection apparatus as described in claim 5 wherein said first detection chamber entrance width is 2.5 cm, said exit width is 10 cm, said entrance height is 0.16 cm and said exit height is 0.02 cm and the distance from entrance to exit is 65 cm.

16. A particle detection apparatus as described in claim 4 for radon progeny wherein the first detection chamber forms a diffusion battery comprising means for plating out the unattached progeny on the detection chamber walls nearer the entrance to the detection chamber and plating out the nucleation mode progeny on the walls of the first detection chamber nearer the exit thereof wherein an activity weighted size distribution pattern is obtained on the radiation detection means.

17. A particle detector apparatus as described in claim 1 wherein said detection means comprises a removable longitudinal strip of detection material positioned on the inside top of said first and second detection chambers.

18. In a particle detector for radon progeny of the type having first and second detection chambers connected together for smooth air flow therethrough, a first detection chamber having top, bottom and sides forming a chamber;
   a layer of radiation detection material coated on at least a portion of the inside of said top;
   said bottom being spaced from said top a decreasing distance from the entrance to exit ends of said chamber; and
   said sides being spaced apart an increasing amount from entrance to exit ends of said chamber.

19. A particle detection detector as described in claim 18 for radon progeny further including a layer of radiation attenuation material coated on said radiation detection material such that the alpha particle progeny are slowed sufficiently to permit differentiation between particles emitted from Po218 and Po214.

20. The method of determining size distribution of particles in an airstream comprising the steps of:
   passing an airstream containing particles through a first detection chamber to plate out the ultrafine particles;
   passing said airstream through a second detection chamber to filter out the particles not plated out in said first chamber;
   providing detection material on at least a portion of one interior surface of the detection chambers; and
   varying the physical characteristics of said first chamber from entrance to exit so that particles of different sizes are plated out in the interior of said first chamber at different distances from the entrance to said first chamber whereby analysis of said detection material will yield size distribution data for said plated out and filtered out particles.

21. The method of claim 20 further defined by decreasing the airstream velocity in said first chamber from entrance to exit to assist in plating out the larger ultrafine particles.

22. The method of claim 20 further including varying the physical characteristics of said first chamber by providing a plurality of diffusion screens in said first detection chamber spaced at increasing intervals from entrance to exit so that the airstream will pass therethrough and the diffusion coefficient of the $d_p$ (50%) particle size of the screens form a geometric progression.

23. The method of claim 22 further including increasing the cross sectional area of said first detection chamber from entrance to exit and decreasing the diffusion screen mesh size from entrance to exit diffusion screens.

24. The method of claim 20 further including decreasing the spacing between the top and bottom surfaces of said first detection chamber.

25. The method of claim 20 further including providing said detection material in the form of a narrow longitudinal strip on the inside top of said first detection chamber and calculating the size distribution of the radon progeny based on the proportional sample detected on the narrow longitudinal strip.

* * * * *